United States Patent Office 2,698,135
Patented Dec. 28, 1954

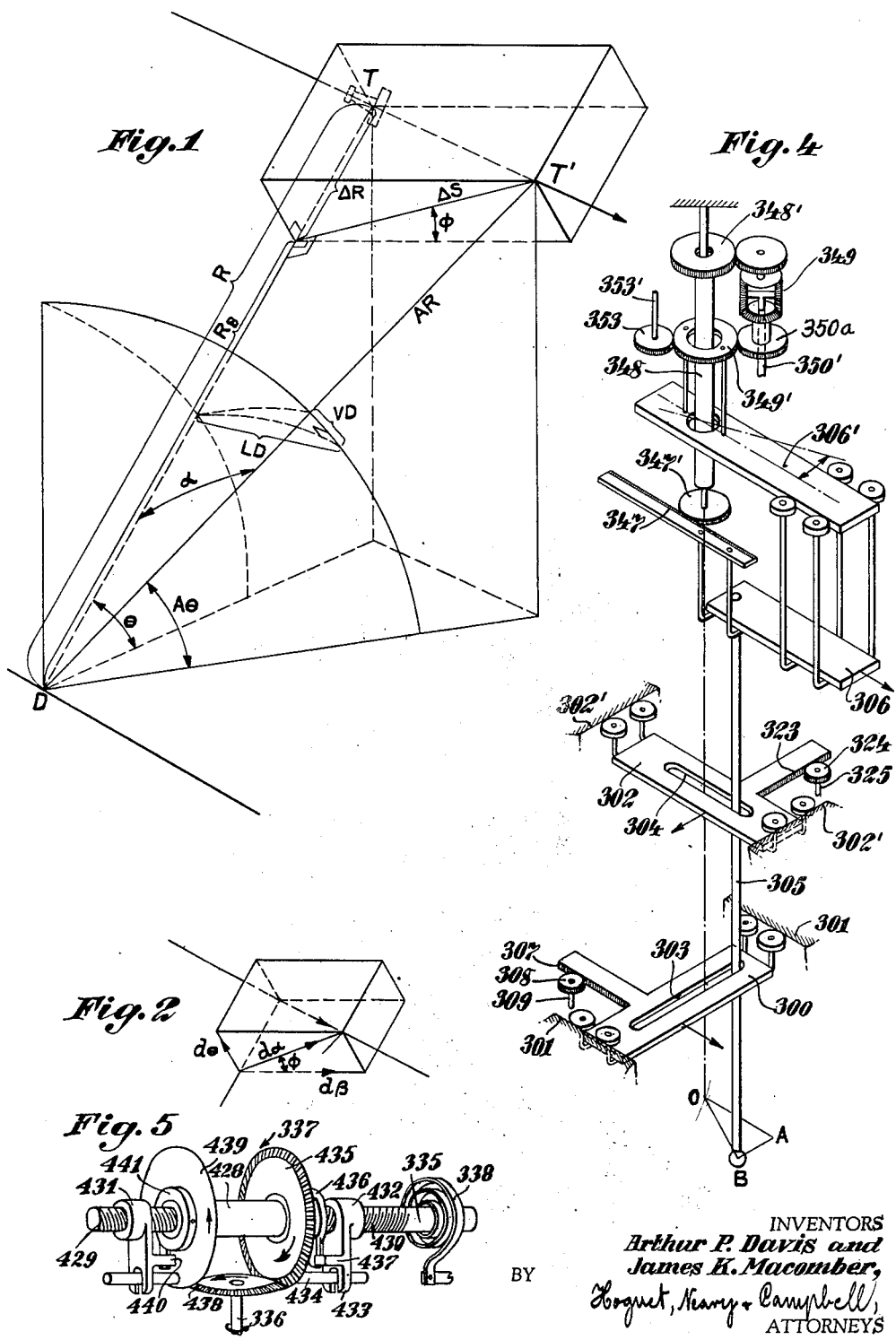

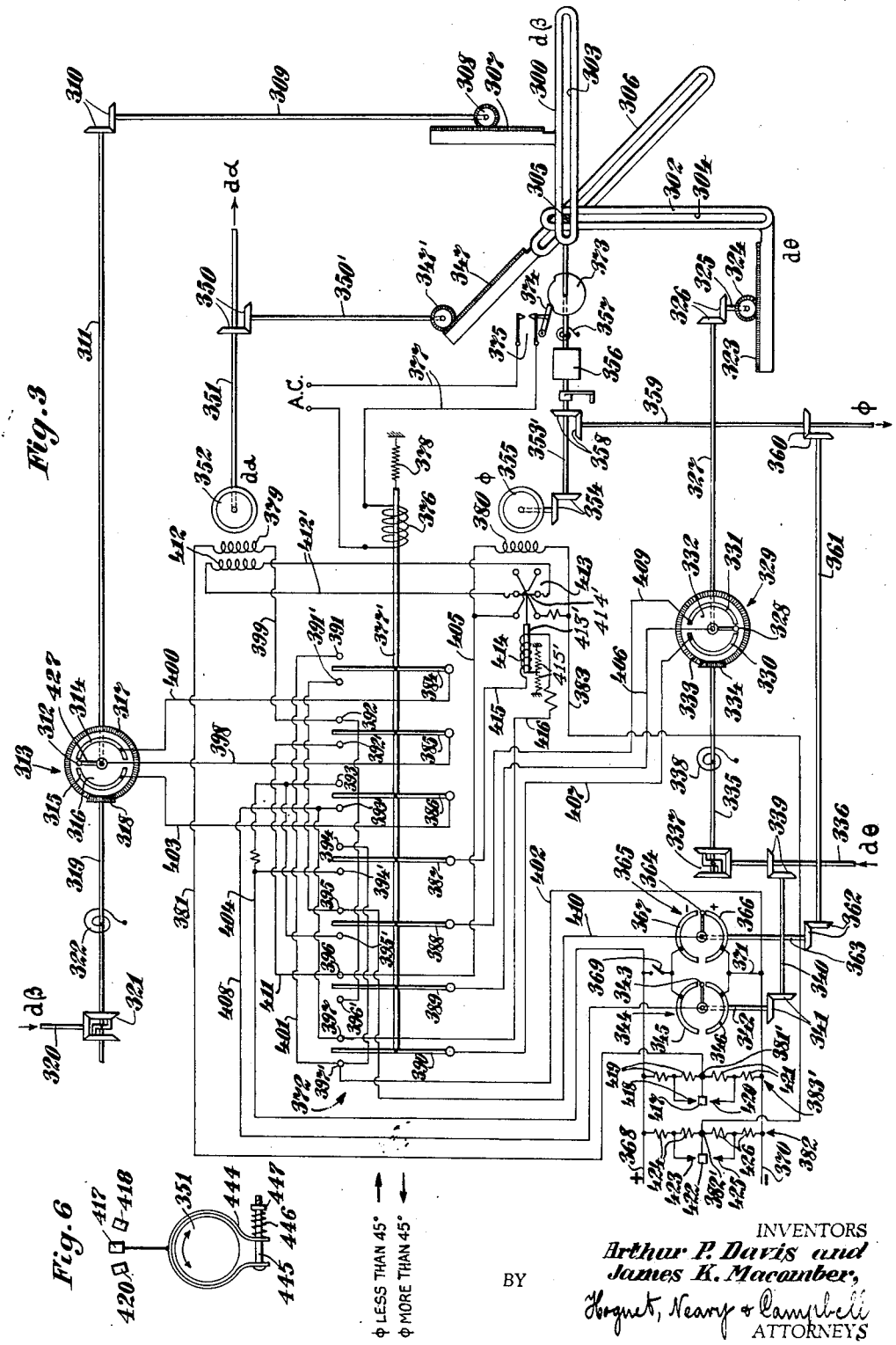

2,698,135

CALCULATING DEVICE

Arthur P. Davis, Stamford, Conn., and James K. Macomber, Rockville Centre, N. Y., assignors to American Bosch Arma Corporation, a corporation of New York Application December 19, 1938, Serial No. 246,681

9 Claims. (Cl. 235—61.5)

This invention relates to calculating devices, and more particularly to apparatus for determining mechanically the vector resultant of a pair of mutually perpendicular vectors, and the angle between the resultant and one of the component vectors.

Calculating devices of this character may be used in gun fire control apparatus, whose function it is to set up and solve the mathematical relations between a given point on a plane and a moving surface or aerial target in order that a gun or guns may be maintained directed at the target.

In order that the calculating device of this invention may be more completely understood, it will be described in conjunction with the aforementioned gun fire control apparatus and the problem diagram upon which such apparatus is based, although it will be understood that the calculating device of this invention is not limited to the problems incident to gun fire control.

For a more complete understanding of the invention, reference may be had to a view of the vector mechanism of the apparatus in the accompanying drawings, in which:

Figure 1 illustrates the aforementioned problem diagram;

Fig. 2 is a reduced view of portions of the diagram of Fig. 1;

Fig. 3 is a schematic diagram of the calculating device of this invention;

Fig. 4 is an enlarged perspective view of the vector mechanism of the device;

Fig. 5 is a perspective view of reversing mechanism; and

Fig. 6 illustrates a frictionally-operated electrical contact mechanism.

Referring to the problem diagram illustrated by Fig. 1, T designates the target, which may be an aeroplane, for example, moving in a straight line at constant speed, and D is the gun fire control apparatus or director mounted on own ship. The line R represents the present range, and also the present line of sight from the director D to the target T. T' is the advance predicted target position, which is the position of the target at a later time equal to the time of flight TF of the projectile, time being measured from the line of sight position of the target T.

It is required to determine the lateral deflection LD and the vertical deflection VD which must be given to the gun in order that a projectile fired when the target T is in the line of sight position will strike the target at the advance predicted position T'. The proper angular values of LD and VD may be determined by spherical trigonometry. It is necessary, however, that the angles $\theta$, $\alpha$, and $\phi$ be known before the solution can be made. The angle $\phi$ is determined by measuring the mutually perpendicular angular target rates in elevation and train, $d\theta$ and $d\beta$, and composing them into the resultant angular target rate $d\alpha$. The angle $\phi$ may then be determined graphically from a vector diagram, indicated in Fig. 2, or from the relation $$\phi = \tan^{-1}\frac{d\theta}{d\beta}$$

The inputs of target elevation rate, $d\theta$, and target lateral bearing rate $d\beta$, determined elsewhere, are introduced in the calculating device by the shafts 336 and 320, respectively, as illustrated in Fig. 3. Likewise the angle $\phi$ is provided by the rotation of motor 355. Target elevation rate $d\theta$ and target lateral bearing rate $d\beta$ may be determined by the mechanism disclosed in copending application Serial No. 246,680 filed December 19, 1938, now Patent No. 2,658,277, for example.

Thus, the target lateral bearing rate, $d\beta$, is supplied by the mechanism of said application Serial No. 246,680 as an angular displacement of shaft 320 from its zero position, and this displacement is proportional to the angular target rate in train. Similarly, the target elevation rate, $d\theta$, is supplied by the mechanism of said application Serial No. 246,680 as an angular displacement of shaft 336 from its zero position, and this displacement is proportional to the angular target rate in elevation.

Referring to Figs. 3 and 4, the vector mechanism or solver actuated electro-mechanically by the inputs $d\theta$, $d\beta$ includes a carriage 300 slidably mounted in guideways 301 for actuation linearly to provide the solver's output of $d\beta$. A second carriage 302, is slidably mounted in the guideways 302' for actuation linearly to provide the solver's output of $d\theta$. This linear displacement of carriage 302 from its zero position to satisfy inputs of $d\theta$ from shaft 336 is accordingly proportional to $d\theta$, the angular target rate in elevation. The carriages 300 and 302 move at right angles to each other and are provided with longitudinal slots 303 and 304, respectively, through which a vertical shaft 305 projects. The shaft 305 is secured to a radius arm 306 which is slidably mounted on a rotator carriage 306' for actuation longitudinally in accordance with the vector resultant $d\alpha$, and angularly in accordance with the angle $\phi$. The movement of shaft 305 positions the carriages 300 and 302.

The $d\beta$ carriage 300 is provided with a rack 307 which is adapted to engage a pinion 308 secured to shaft 309. The shaft 309 is connected through gearing 310 and shaft 311 to one end of contact arm 427 of follow-up mechanism 313, and the other end of contact arm 427 carries a spring-mounted contact roller or trolley contactor 312. This follow-up mechanism may be of the type illustrated in copending application Serial No. 141,189, filed May 6, 1937, and includes an increasing follow-up segment 314 and a decreasing follow-up segment 315 mounted on an insulated disc 316, both of which may be engaged by the trolley contactor 312 as it rotates. At the outer periphery of the disc 316 is a ring gear 317 meshed with gear 318 on a shaft 319 which receives inputs of $d\beta$ from a shaft 320. Accordingly, the linear displacement of carriage 300 from its zero position to satisfy inputs of $d\beta$ from shaft 320, is proportional to $d\beta$, the angular target rate in train.

In order to conserve space, problems are solved in one quadrant only of the vector mechanism. The device, however, is capable of receiving inputs of $d\beta$ and $d\theta$ in any quadrant and producing a solution whose sense is commensurable to the inputs. This is accomplished by reversing the inputs so that only positive values of $d\theta$ or $d\beta$ are transmitted to the solver. To this end a suitable reversing mechanism 321 is provided between shafts 320 and 319 in order to reverse negative inputs of $d\beta$. Secured to the shaft 319 is a biasing spring 322 which returns the follow-up ring 317 to the zero position when the $d\beta$ input is brought to zero.

The $d\theta$ carriage 302 likewise is provided with a rack 323 which meshes with a pinion 324 on a shaft 325. The shaft 325 is connected through gearing 326 and shaft 327 to a trolley contactor 328 on the $d\theta$ follow-up mechanism 329. The follow-up mechanism 329 includes an increasing segment 330 and a decreasing segment 331 mounted on an insulated disc 332, both of which segments may be engaged by the trolley contactor 328 as it rotates. The outer periphery of the disc 332 is provided with a ring gear 333 meshed with a gear 334 on a shaft 335, which receives inputs of $d\theta$ from a shaft 336 through a suitable reversing mechanism 337 having the aforementioned function of providing only positive inputs of $d\theta$. The reversing mechanism 337 is shown in greater detail in Fig. 5, and consists of an extension 428 of shaft 335, having right hand threads 429 at its free end and left hand threads 430 adjacent shaft 335. A nut 431 travels along threaded portion 429 and nut 432 travels along threaded portion 430. Considering the construction and operation of the mechanism, including nut 432, the latter is provided with a bifurcated lateral extension 433 serving as a guide for pin 434 on bevel gear 435 journalled on shaft 428. A detent 436 pinned to shaft 428 is adapted to be engaged and driven by a lateral extension 437 on nut 432 as the nut moves along 430 to thereby couple shaft 428 to gear 435, which is journalled on shaft 428 and driven by bevel gear 438 on input shaft 336. Bevel gear 438 also drives bevel gear 439 journalled on shaft 428 and coupled thereto by engagement of extension 440 on nut 431 with detent 441 pinned on shaft 428. As the input gear 438 rotates in the direction indicated by the arrow, it drives gears 435 and 439 in the directions indicated by the arrows thereon. Rotation of gear 439 one revolution in the indicated direction causes nut 431 to travel to the left along 429 to disengage extension 440 from detent 441, so that gear 439 is uncoupled from shaft 428. However, the simultaneous rotation of gear 435 one revolution in the indicated direction causes nut 432 to travel to the left along 480 to engage and drive detent 436. Inasmuch as detent 436 is pinned to shaft 428, the drive thereof by detent 436 of gear 435 results in rotation of shafts 428 and 335 in the same direction as gear 435, because it is coupled thereto through the connections 432, 433, 434, 436 and 437. The shaft 335 is provided with a restoring spring 338, which, as the shaft 335 is rotated in the direction of the arrow on gear 435, is tensioned and acts to return follow-up ring 333 to zero position when input shaft 336 is returned to its zero position. In returning the follow-up ring 333 to zero position, the restoring spring 338 reverses the initial direction of rotation of the follow-up ring 333. It will be observed that if restoring spring 338 were not provided, the restoration of input shaft 336 to zero position would not restore follow-up ring 333 to zero position. The reversing gear 321 and restoring spring 322 are similarly constructed and arranged.

Inputs of $d\theta$ are also transmitted from the shaft 336 through the gearing 339, shaft 340, gearing 341, and the shaft 342 to a trolley contactor 343 on the $d\theta$ switch 344, whose function will be described in detail later. The $d\theta$ switch 344 comprises a positive segment 345 and a negative segment 346, each of which may be selectively engaged by the trolley contactor 343 as it rotates in response to positive or negative inputs of $d\theta$.

The $d\alpha$ radius arm 306 is moved longitudinally by means of a rack 347 thereon which meshes with a pinion 347' mounted on a shaft 348, as shown in Fig. 4. The shaft 348 is connected through the gear 348' to one side of a differential 349, whose other side 350a journalled on shaft 350' receives an input of $\phi$ from a gear 349' mounted on the rotator carriage 306'. The differential 349 adds a function of the angle $\phi$ to the output of $d\alpha$ from the gear 348' to correct for rotation of the radius arm 306 about the pinion 347'. The spider of the differential 349 is connected through a shaft 350' and the gearing 350 to the shaft 351 of the motor 352.

The rotator carriage 306' is rotated in accordance with the angle $\phi$ by the gear 349' meshed with a gear 353 on a shaft 353' which is connected through the gearing 354 to the $\phi$ input motor 355. The output of the $\phi$ motor 355 is transmitted through a reversing mechanism 356, like that shown in Fig. 5, in order that only positive values of $\phi$ will be received by the solver. The shaft 353' is also provided with a biasing spring 357 to restore the radius carriage 306 to the zero $\phi$ position parallel to the $d\beta$ carriage 300, when the $\phi$ motor 355 drives to its zero position.

The output of $\phi$ from the $\phi$ motor 355 is also transmitted from the shaft 353' through the gearing 358, shaft 359, gearing 360, shaft 361, gearing 362 and shaft 363 to a trolley contactor 364 on the $\phi$ switch 365. The $\phi$ switch 365 includes a positive segment 366 and a negative segment 367 which are fixed in position and which are engaged by the trolley contactor 364 in its rotation. The negative $\phi$ segment 367 and the positive $d\theta$ segment 345 are connected together and to the positive D. C. line 368 through a micro-switch 369. Micro-switch 369 is automatically opened by suitable mechanism (not shown) when the inputs are no longer commensurate with the values capable of being handled by the apparatus. It breaks the circuit to the increasing field of the $\phi$ motor and renders it inoperative in an increasing direction until the input values again come within the useful ranges of the apparatus.

The positive $\phi$ segment 366 and the negative $d\theta$ segment 346 are connected together and to the negative D. C. line 370 through a wire 371. The purpose of the $d\theta$ switch 344 and the $\phi$ switch 365, will be described further in connection with the 45° switch on the solver.

The control of the $d\alpha$ motor 352 and the $\phi$ motor 355 is switched between the $d\beta$ follow-up 313 and the $d\theta$ follow-up 329, depending on whether $\phi$ is less than or greater than 45°. This is accomplished by the operation of a gang switch 372 which is controlled by a cam 373 mounted on the $\phi$ motor 355 shaft 353'. As the latter rotates through 45°, the cam 373 raises the follower 374, thus closing a switch 375 and energizing a relay 376 from an A. C. voltage supply through wires 377. Energized relay 376 moves its armature 377' against the tension spring 378, breaking one set of contacts and making a second set of contacts to switch the control of the $\phi$ and $d\alpha$ motors between the $d\beta$ and $d\theta$ follow-up heads.

The direction of rotation of the $d\alpha$ motor 352 and the $\phi$ motor 355 is controlled by changing the polarity of their field windings 379 and 380 of motors 352 and 355, respectively. One end of the field winding 379 is connected by wire 381 to the midpoint 381' of a bank of resistors 383' which are shunted across the D. C. lines 368 and 370. Similarly, one end of the winding 380 of the $\phi$ motor 355 is connected through a wire 383 to the midpoint 382' of a second bank of resistors 382, also shunted across the D. C. lines 368 and 370. The polarity of these windings is reversed by switching the other ends thereof to either wire 368 or 370 as may be necessary. The polarity of field winding 379 is under the joint control of follow-up head 313 and gang switch 372, while the polarity of field winding 380 is under the joint control of follow-up head 329 and gang switch 372. be necessary.

Connected to midpoint 381' is a rotatable contactor 417 frictionally operated by $d\alpha$ motor 352 (Fig. 6), which, for rotation of $d\alpha$ motor 352 in one direction, engages a contact 418, connected between two adjacent resistors 419 on one side of midpoint 381' and for rotation in the reverse direction engages contact 420 connected between the two adjacent resistors 421 on the other side of midpoint 381'. Similarly, a second rotatable contactor 422, frictionally operated by $\phi$ motor 355, is connected to midpoint 382', which for rotation of $\phi$ motor 355 in one direction engages a contact 423, connected between the two adjacent resistors 424 on one side of midpoint 382', and for rotation in the opposite direction, engages a contact 425 connected between the two adjacent resistors 426 below the midpoint 382'. The frictionally-operated contactors 417 and 422 may be of any suitable construction, such as that illustrated in Fig. 6. Considering contactor 417, the armature shaft 351 of motor 352 is encircled by a brake shoe 444, lined with friction material, or the like, and lightly engaging the shaft 351 so as to rotate therewith, the degree of friction between it and shaft 351 being variable by adjusting nut 447 along bolt 445 to vary the pressure of spring 446. Contact 417 is carried by the brake shoe 444 and moves between contacts 418 and 420, which also act as stops, so that when contact 417 is moved against either of them, its movement is stopped in that direction and brake shoe 444 slips on shaft 351. The contactor 423 is actuated by a similar brake shoe arrangement coupled frictionally to armature shaft 353' of motor 355.

The contactors 417 and 422 control the voltage divider action of the banks of resistors 383' and 382, respectively, thus controlling the voltages impressed on field winding 379 of $d\alpha$ motor 352, and field winding 380 of $\phi$ motor 355 respectively. In operation, they assist in damping the motors by applying low voltages to their field windings in starting, and, by increasing the field voltages when the motors over drive, thus slowing them down and causing them to reverse quickly.

The gang switch 372 includes a group of seven contactors, 384 through 390, each of which is adapted to make either of two connections, depending on whether or not the relay 376 is energized. Gang switch 372 is shown in the intermediate or neutral position in Fig. 3 and in the normal deenergized position of the relay 376, the contactors 384 through 390 engage the contacts 391 through 397, respectively, and when the relay 376 is energized, contactors engage the contacts 391' through 397', respectively, thereby completing several circuits between the $d\beta$ and $d\theta$ follow-up heads and the $\phi$ and $d\alpha$ motors.

When the angle $\phi$ is less than 45°, the trolley 312 of follow-up mechanism 313 is connected through a wire 398, contactor 385, contact 392 and a wire 399 to the free end of the $d\alpha$ motor 352 field winding 379, the other end of which is connected through the wire 381 to the midpoint of the bank of resistors 383' between the wires 368 and 370 of the D. C. line. For values of increasing $d\beta$, the free end of the field winding 379 is connected to the trolley 312, increasing contact segment 314 of follow-up mechanism 313, wire 400, contactor 384, contact 391, wire 401, contact 397' and wire 402 to the negative side 370 of the D. C. line.

Conversely, if $d\beta$ is decreasing in magnitude, the free end of the winding 379 is connected through the trolley 312, decreasing contact segment 315 of follow-up mechanism 313, wire 403, contactor 386, contact 393 and a wire 404 to the positive side 368 of the D. C. line. Thus, for increasing $d\beta$, voltage of a given polarity is impressed on the $d\alpha$ motor field winding 379, causing it to rotate in the increasing direction, and for decreasing $d\beta$ voltage of reverse polarity is applied to the winding causing the motor to reverse its direction of rotation.

For the same position of the gang switch 372 the free end of the $\phi$ motor 355 field winding 380 is connected through a wire 405, contact 396, contactor 389, and a wire 406 to the trolley contactor 328 of the $d\theta$ follow-up mechanism 329, where it may be connected to either the positive wire 368 or the negative wire 370 of the D. C. supply, depending on whether or not the $d\theta$ input is positive or negative and increasing or decreasing.

For values of increasing $d\theta$, the trolley contactor 328 engages the increasing segment 330 of $d\theta$ follow-up mechanism 329, thus completing a connection through a wire 407, contactor 390, contact 397 and a wire 408 to the trolley contactor 343 on the $d\theta$ switch 344, which is rotated in accordance with a mechanical input from the $d\theta$ shaft 336. If the $d\theta$ input is positive, the trolley contactor 343 of the $d\theta$ switch 344 will engage the positive segment 345 and thus complete the circuit through the micro-switch 369 to the positive wire 368 of the D. C. supply. This will cause the $\phi$ motor 355 to rotate in the direction of increasing positive $\phi$.

On the other hand, if the $d\theta$ input is negative, the trolley contactor 343 of $d\theta$ switch 344 will engage negative segment 346, thus completing the circuit of the field motor winding 380 through the wire 371 to the negative wire 370 of the D. C. supply. This will reverse the direction of rotation of the $\phi$ motor so that its shaft 353' will rotate in the direction of increasing negative $\phi$. Inasmuch as the output of the shaft 353' is transmitted to the solver through reversing mechanism 356, the values of $\phi$ set up in the solver are always positive regardless of whether $\phi$ actually is positive or negative. In other words, if the shaft 336 is at one extreme position of travel, say at the maximum positive $d\theta$ position, its movement from that position represents decreasing positive $d\theta$ up to one-half its possible rotation, which is zero $d\theta$, from whence it rotates in the same direction toward maximum negative $d\theta$. Owing to the reversing mechanism 337, only the positive $d\theta$ movement is transmitted by shaft 336 to shaft 335 for controlling the contact between contactor 338 and positive segment 330 of follow-up mechanism 329. The terms "decreasing" and "increasing" employed to characterize direction in terms of angle or function have the meaning described herein.

Thus, for values of decreasing $d\theta$ the trolley contactor 328 on the follow-up mechanism 329 engages the decreasing segment 331, thus connecting the free end of the $\phi$ motor field winding 380 through trolley contactor 328, decreasing segment 331, a wire 409, contactor 388, contact 395 and wire 410 to trolley contactor 364 on the $\phi$ switch 365. If the value of $\phi$ at the shaft 353' is positive, the trolley contactor 364 will be in engagement with the positive $\phi$ segment 366, thus completing the circuit through the wire 371 to the negative wire 370 and the D. C. supply. This will reverse the voltage applied to the field 380, thus causing the motor 355 to rotate the radius arm 306 in a clockwise direction toward zero $\phi$, i. e., in the decreasing direction of positive $\phi$.

If, on the other hand, the value of $\phi$ previously set up on the shaft 353' by shaft 359 is negative, the $\phi$ contactor 364 will be in engagement with the negative $\phi$ segment 367, completing the circuit through the micro-switch 369 to the positive wire 368 of the D. C. supply. This will impress voltage of correct polarity on the $\phi$ motor field winding 380 to cause the $\phi$ motor 355 to rotate in the decreasing direction for negative $\phi$.

Inasmuch as the trolley contactor 343 of the $d\theta$ switch 344 receives an input of $d\theta$ directly from the $d\theta$ shaft 336, it enables the $\phi$ motor 355 to be instantly energized from the zero position. Correspondingly, the $\phi$ switch 365 instantly deenergizes the $\phi$ motor 355 when the latter has decreased to zero, thus preventing the $d\beta$ and $d\theta$ follow-up mechanisms 313 and 329, respectively, from overshooting their respective zero positions as the inputs of $d\theta$ and $d\beta$ are brought to zero.

When the value of the angle $\phi$ set up in the solver is approximately 45°, the switch 375 is closed by the cam 373, thus energizing the relay 376 and breaking contacts 391 through 397 and making contacts 391' through 397'. This operation switches the control of the $\phi$ motor from the $d\theta$ follow-up mechanism to the $d\beta$ follow-up mechanism, and also the control of the $d\alpha$ motor from the $d\beta$ follow-up mechanism to the $d\theta$ follow-up mechanism.

Thus, the trolley contactor 312 of $d\beta$ follow-up mechanism is now connected through the wire 398, contactor 385, contact 392', wire 411 and the wire 405 to the free end of the $\phi$ motor field winding 380. The increasing segment 314 of the follow-up mechanism 313 is now connected through the wire 400, contactor 384, contact 391' and wire 410 to trolley contactor 364 on $\phi$ switch 365. The decreasing segment 315 of follow-up mechanism 313 is connected through wire 403, contactor 386, contact 393' and wire 408 to trolley contactor 343 on the $d\theta$ switch 344. The $d\beta$ follow-up mechanism 313 accordingly controls the polarity of the $\phi$ motor field winding 380 through the $d\theta$ switch 344 and the $\phi$ switch 365 substantially as described above in connection with the $d\theta$ follow-up head for values of $\phi$ less than 45°.

By operation of gang switch 372, trolley contactor 328 on the $d\theta$ follow-up mechanism 329 is connected through wire 406, contactor 389, contact 396' and wire 399 to the free end of the $d\alpha$ motor field winding 379. The polarity of the voltage applied to the winding 379, accordingly, may be reversed, depending on whether the trolley contactor 328 engages the increasing segment 330 or the decreasing segment 331 of the $d\theta$ follow-up mechanism 329. The increasing segment 330 completes a circuit through wire 407, contactor 390, contact 397' and wire 402 to the negative wire 370 of the D. C. supply. Similarly, the decreasing segment 331 of the $d\theta$ follow-up mechanism 329 completes a circuit through wire 409, contactor 388, contact 395' and wire 404 to the positive wire 368 of the D. C. supply.

The $d\alpha$ motor is provided with an auxiliary field winding 412, which enables it to anticipate its direction of drive to satisfy the $\phi$ motor drive. The winding 412 is supplied with power from a reversing switch 413 through the wires 412'. The reversing switch 413 is a double-throw, double-pole, solenoid-operated polarized relay, with its poles cross-connected as shown. It is normally open due to centering springs 415' connected to its armature 413', having north and south poles and lying within the field of relay coil 414. Switch 413 is supplied with unidirectional current by leads 387 and 405, and its two directional output leads are designated 412', which are flexible as shown, to permit movement of the insulating switch bar 414' carrying the movable switch contacts. The reversing switch 413 is connected to the wires 405 and 383 which supply voltage to the $\phi$ motor field winding 380, so that the auxiliary $d\alpha$ motor winding 412 is energized when the $\phi$ motor field 380 is energized and the voltage applied to it may be of the same or of opposite polarity to that applied to the $\phi$ motor field winding 380. One end of the solenoid or relay 414 of reversing switch 413 is connected through a wire 415 to contactor 387, and the other end of which is connected through a wire 416 and wire 408 to the trolley contactor 343 of the $d\theta$ switch 344.

For values of $\phi$ less than 45°, when the relay 376 of gang switch 372 is deenergized, the wire 415 is connected through contactor 387, contact 394 and wire 402 to the negative wire 370 of the D. C. supply. If $d\theta$ is positive, therefore, so that the trolley contactor 343 of $d\theta$ switch 344 engages positive segment 345, the reversing switch relay 414 will be energized in one direction. If, however, $\phi$ is negative, $d\theta$, by the geometry of the problem must also be negative and the trolley contactor 343 will engage negative segment 346, thus connecting the wire 416 to the negative line. With this connection, the relay 414 will not be energized. It will be evident, therefore, that the reversing switch 413 will be actuated when $\phi$ is less than 45° and positive, but will not be actuated when $\phi$ is less than 45° and negative.

When $\phi$ is greater than 45° and the relay 376 of gang switch 372 is energized, one side of the reversing switch relay 414 will be connected through the wire 415, contactor 387, contact 394', and wire 404, to the positive wire 368 of the D. C. supply. The other side of the relay 414 is connected through wire 416, wire 403 to the trolley contactor 343 of $d\theta$ switch 344. Accordingly, if $d\theta$ is positive, the wire 416 is connected to the positive line and the relay 414 is not energized. If $\phi$ is negative, then the wire 416 is connected to the negative line and the relay 414 will be energized. It will be seen, therefore, that for positive values of $\phi$ greater than 45°, reversing switch 413 will not be operated, whereas for negative values of $\phi$ greater than 45°, the switch will operate.

The manner of operation of the solver may be better understood by following through a typical example which might be presented for solution in practice. It will be preferable for the sake of simplicity to confine the example to the first quadrant, although it will be evident that problems may be taken from any quadrant for solution.

Let us assume that initial inputs from zero of $d\beta$ and $d\theta$ are transmitted to the system through shafts 320 and 336, respectively, to set up an angle of $\phi$ less than 45° in the solver. These inputs displace the follow-up rings 317 and 333 on the $d\beta$ follow-up mechanism 313 and the $d\theta$ follow-up mechanism 329, respectively, energizing both field windings 379 and 380 of the $d\alpha$ motor 352 and the $\phi$ motor 355, respectively. The $\phi$ motor 355 and the $d\alpha$ motor 352 both rotate in the increasing direction. Motor 355 rotates the rotator carriage 306' through the angle $\phi$, and motor 352 moves the $d\alpha$ radius arm 306 longitudinally, corresponding to the magnitude of the resultant $d\alpha$. Inasmuch as the arm 306 is mechanically coupled to the carriages 300 and 302 through the vertical shaft 305 and the cooperating slots 303 and 304, the movement of the arm 306 causes the carriages 300 and 302 to assume positions commensurate with the magnitude of the components of vector resultant represented by the arm 306.

The motors will continue to rotate until the $d\beta$ carriage 300 and the $d\theta$ carriage 302 have adjusted themselves to the inputs of $d\beta$ and $d\theta$ to the follow-up rings 317 and 333 of the follow-up mechanisms 313 and 329, respectively. Follow-up mechanisms 313 and 329 then will be in their neutral positions, with trolley 312 disengaged from its respective contact segments 314, 315, and trolley 328 disengaged from its respective contact segments 330, 331, and as a result motors 352 and 355 will be deenergized. The angle $\phi$ will then be set up in the solver and the arm 306 will have moved a distance corresponding to the value of $d\alpha$ determined by the values of $d\beta$ and $d\theta$.

Assume now a further input of increasing $d\theta$ from the shaft 336. This input displaces the follow-up ring 333 of $d\theta$ follow-up mechanism 329 in the increasing direction and energizes the $\phi$ motor field winding 380 through the $d\theta$ switch 344 causing it to rotate in the direction of increasing $\phi$. Meanwhile, since the $\phi$ motor field winding 380 is energized, and $\phi$ is positive and less than 45°, the reversing switch relay 414 is energized as described above, so that the auxiliary field winding 412 of the $d\alpha$ motor 352 is energized. The $d\alpha$ motor therefore beings to rotate slowly in the increasing direction in anticipation of the increasing rotation of the $\phi$ motor 355. If the speed of rotation of the $d\alpha$ motor 352 under the influence of the auxiliary field 412 is not sufficient to maintain the $d\beta$ carriage 300 in its initial position, considering that any tendency of the rotation of arm 306' to traverse the rack 347 and the carriages 306 and 300 is always neutralized by the input from gear 349' to gear 350a of the differential, the trolley contactor 312 on $d\beta$ follow-up mechanism 313 will be displaced to the decreasing segment 315, thus applying full voltage to the motor winding 379 of the $d\alpha$ motor 352, and causing it to rotate rapidly in the increasing direction until the entire system is in balance. The angular displacement of shaft 351 from its zero position is proportional to $d\alpha$, while the angular displacement of shaft 359 from its zero position is proportional to $\phi$. These outputs may be indicated or utilized for determining data for laying a gun.

It will be evident from the foregoing that the invention provides a highly accurate device for composing a pair of mutually perpendicular vector components into their vector resultant. Furthermore, inasmuch as only positive inputs are transmitted to the solver so that problems are solved in one quadrant only, regardless of the quadrant in which the problem may be set up, the invention provides a solving device which may be enclosed in a minimum amount of space.

The embodiment described above is given as being illustrative of the invention only and the latter is not intended to be in any way limited thereby, but is susceptible of numerous changes in form and detail within the scope of the appended claims.

We claim:

1. In a calculating device for composing a pair of vector components into their vector resultant, the combination of a movable element, means corresponding to said element and driven in one direction in accordance with the magnitude of a vector component, means for driving the same, a second movable element, second means corresponding to said second element and driven in one direction in accordance with the magnitude of a second vector component, means for driving the same, a member jointly driven in response to positional disagreement between said movable elements and the means corresponding thereto and representing the magnitude of the vector resultant of said vector components, and means rendered operative at a predetermined position of one of said driving means, and responsive to change in the magnitude of the vector component corresponding thereto tending to move the corresponding driven means in a predetermined direction, for maintaining the direction of movement of the said corresponding driven means, whereby problems set up in any quadrant may be solved in one quadrant and the solution indicated by the said member.

2. In a calculating device for composing a pair of vector components into their vector resultant, the combination of a movable element, input means corresponding to said movable element and movable in one direction in accordance with the magnitude of a vector component, means for driving the same, a second movable element, second input means corresponding to said second movable element and movable in one direction in accordance with a second vector component magnitude, means for driving the same, a member representing a vector resultant and having a driving connection with each of said elements, power means responsive to positional disagreement between one of said elements and its input means for moving the said member linearly, second power means responsive to positional disagreement between the second said element and its input means for rotating the said member through an angle, and mechanism rendered operative at a predetermined position of one of said driving means, and responsive to change in the magnitude of the vector component corresponding thereto tending to move the corresponding input means in a predetermined direction, for maintaining the direction of movement of said corresponding input means, whereby a problem set up in any quadrant may be solved in one quadrant.

3. In a calculating device for composing a pair of vector components into their vector resultant, the combination of a movable element, input means corresponding to said movable element and movable in one direction in accordance with the magnitude of a vector component, means for driving the same, a second movable element, second input means corresponding to said second movable element and movable in one direction in accordance with a second vector component magnitude, means for driving the same, a member representing a vector resultant and having a driving connection with each of said elements, power means responsive to positional disagreement between one of said elements and its input means for moving the said member linearly, second power means responsive to positional disagreement between the second of said elements and its input means for rotating said member through an angle, and mechanisms rendered operative at predetermined positions of said two driving means, respectively, and responsive, respectively, to inputs tending to move said input means in predetermined directions for maintaining the directions of the inputs to said respective input means.

4. In a calculating device for composing a pair of vector components into their vector resultant, the combination of a movable element, input means corresponding to said movable element and movable in one direction in accordance with the magnitude of a vector component, means for driving the same, a second movable element, second input means corresponding to said second movable element and movable in one direction in accordance with a second vector component magnitude, means for driving the same, a member representing a vector resultant and having a driving connection with each of said elements, power means responsive to positional disagreement between one of said elements and its input means for moving the said member linearly, second power means responsive to positional disagreement between the second of said elements and its input means for rotating the said member through an angle, mechanisms rendered operative at predetermined positions of said two driving means, respectively, and responsive, respectively, to inputs tending to move said input means in predetermined directions for maintaining the directions of the inputs to said respective input means, and switching means responsive to movement of said member to a predetermined angular position for causing said first power means to respond to positional disagreement between said second element and its input means and for causing the second power means to respond to positional disagreement between said other element and its input means.

5. In a calculating device for composing a pair of vector components into their vector resultant, the combination of a movable element, input means corresponding to said movable element and movable in one direction in accordance with the magnitude of a vector component, means for driving the same, a second movable element, second input means corresponding to said second movable element and movable in one direction in accordance with a second vector component magnitude, means for driving the same, a member representing a vector resultant and having a driving connection with each of said elements, power means responsive to positional disagreement between one of said elements and its input means for moving the said member linearly, second power means responsive to positional disagreement between the second of said elements and its input means for rotating the said member through an angle, mechanisms rendered operative at predetermined positions of said two driving means, respectively, and responsive, respectively, to inputs tending to move said input means in predetermined directions for maintaining the directions of the inputs to said respective input means, switching means actuated by one of said input means for controlling the direction of rotation of said last named power means, and means rendered operative upon movement of said member to a predetermined angular position, and responsive to movement of said second power means tending to cause said member to move in a predetermined direction, for reversing the direction of movement of said member.

6. In a calculating device for composing a pair of vector components into their vector resultant, the combination of a movable element, input means corresponding to said movable element and movable in one direction in accordance with the magnitude of a vector component, means for driving the same, a second movable element, second input means corresponding to said second movable element and movable in one direction in accordance with a second vector component magnitude, means for driving the same, a member representing a vector resultant and having a driving connection with each of said elements, power means responsive to positional disagreement between one of said elements and its input means for moving the said member linearly, second power means responsive to positional disagreement between the second of said elements and its input means for rotating the said member through an angle, mechanisms rendered operative at predetermined positions of said two driving means, respectively, and responsive, respectively, to inputs tending to move said input means in predetermined directions for maintaining the directions of the inputs to said respective input means, and switching means actuated by said last named power means for controlling the direction of rotation of said last named power means.

7. In a calculating device for composing a pair of vector components into their vector resultant, the combination of a movable element, input means corresponding to said movable element and movable in one direction in accordance with the magnitude of a vector component, means for driving the same, a second movable element, second input means corresponding to said second movable element and movable in one direction in accordance with a second vector component magnitude, means for driving the same, a member representing a vector resultant and having a driving connection with each of said elements, power means responsive to positional disagreement between one of said elements and its input means for moving the said member linearly, second power means responsive to positional disagreement between the second of said elements and its input means for rotating said member through an angle, mechanisms rendered operative at predetermined positions of said two driving means, respectively, and responsive, respectively, to inputs tending to move said input means in predetermined directions for maintaining the directions of the inputs to said respective input means, switching means actuated by one of said input means for controlling the direction of rotation of said last named power means, a second switching means responsive to movement of said member to a predetermined angular position for causing said first power means to respond to positional disagreement between said second element and its input means and for causing the second power means to respond to positional disagreement between said other element and its input means.

8. In a calculating device for composing a pair of vector components into their vector resultant, the combination of a movable element, input means corresponding to said movable element and movable in one direction in accordance with the magnitude of a vector component, means for driving the same, a second movable element, second input means corresponding to said second movable element and movable in one direction in accordance with a second vector component magnitude, means for driving the same, a member representing a vector resultant and having a driving connection with each of said elements, power means responsive to positional disagreement between one of said elements and its input means for moving the said member linearly, second power means responsive to positional disagreement between the second of said elements and its input means for rotating said member through an angle, mechanisms rendered operative at predetermined positions of said two driving means, respectively, and responsive, respectively, to inputs tending to move said input means in predetermined directions for maintaining the inputs to said respective input means in the same directions, switching means actuated by said last named power means for controlling the direction of rotation of said last named power means, and second switching means responsive to a predetermined angular position of said member for causing said first power means to respond to positional disagreement between said second element and its input means and for causing the second power means to respond to positional disagreement between said other element and its input means.

9. In a calculating device for composing a pair of vector components into their vector resultant, the combination of a movable element, input means corresponding to said movable element and movable in one direction in accordance with the magnitude of a vector component, means for driving the same, a second movable element, second input means corresponding to said second movable element and movable in one direction in accordance with a second vector component magnitude, means for driving the same, a member representing a vector resultant and having a driving connection with each of said elements, power means responsive to positional disagreement between one of said elements and its input means for moving the said member linearly, second power means responsive to positional disagreement between the second of said elements and its input means for rotating said member through an angle, mechanisms rendered operative at predetermined positions of said two driving means, respectively, and responsive, respectively, to inputs tending to move said input means in predetermined directions for maintaining the inputs to said respective input means in the same directions, and means rendered operative by movement of said member to a predetermined angular position and responsive to movement of said second power means tending to rotate said member in a predetermined direction for reversing the direction of rotation of said member, whereby problems set up in any quadrant may be solved in one quadrant only.

References Cited in the file of this patent

UNITED STATES PATENTS

| Number | Name | Date |
|---|---|---|
| 1,450,410 | Cox | Apr. 3, 1923 |
| 1,811,688 | Gray | June 23, 1931 |
| 1,827,812 | Ford | Oct. 20, 1931 |
| 1,849,611 | Bussei | Mar. 15, 1932 |
| 2,065,303 | Chafee | Dec. 22, 1936 |